United States Patent
Kobayashi et al.

(10) Patent No.: US 11,180,656 B2
(45) Date of Patent: Nov. 23, 2021

(54) SILICONE EMULSION COMPOSITION CAPABLE OF BEING FORMED INTO COATING FILM, AND COATING FILM

(71) Applicant: SHIN-ETSU CHEMICAL CO., LTD., Tokyo (JP)

(72) Inventors: Akihiro Kobayashi, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 148 days.

(21) Appl. No.: 16/488,081

(22) PCT Filed: Feb. 8, 2018

(86) PCT No.: PCT/JP2018/004323
§ 371 (c)(1),
(2) Date: Aug. 22, 2019

(87) PCT Pub. No.: WO2018/155203
PCT Pub. Date: Aug. 30, 2018

(65) Prior Publication Data
US 2020/0048461 A1  Feb. 13, 2020

(30) Foreign Application Priority Data

Feb. 23, 2017  (JP) .............................. JP2017-031658

(51) Int. Cl.
*C08L 83/06* (2006.01)
*C08L 83/04* (2006.01)
*C08J 5/18* (2006.01)

(52) U.S. Cl.
CPC ................ *C08L 83/06* (2013.01); *C08J 5/18* (2013.01); *C08L 83/04* (2013.01); *C08J 2383/04* (2013.01); *C08J 2383/06* (2013.01); *C08J 2401/02* (2013.01); *C08J 2401/28* (2013.01); *C08L 2201/52* (2013.01); *C08L 2203/16* (2013.01); *C08L 2205/16* (2013.01)

(58) Field of Classification Search
CPC ....... C08L 83/04; C08L 83/06; C08J 2383/04; C08J 2383/06
See application file for complete search history.

(56) References Cited

U.S. PATENT DOCUMENTS

| 3,817,894 A | 6/1974 | Butler et al. |
| 4,309,319 A | 1/1982 | Vaughn, Jr. |
| 5,102,930 A | 4/1992 | Nakazato et al. |
| 5,360,851 A | 11/1994 | Feder et al. |
| 5,827,921 A | 10/1998 | Osawa et al. |
| 2006/0121300 A1 | 6/2006 | Matsumura |
| 2011/0033398 A1 | 2/2011 | Cauvin et al. |

FOREIGN PATENT DOCUMENTS

| EP | 2 998 360 A1 | 3/2016 |
| JP | 56-16553 A | 2/1981 |
| JP | 56-65046 A | 6/1981 |
| JP | 8-85760 A | 4/1996 |
| JP | 9-3402 A | 1/1997 |
| JP | 9-208826 A | 8/1997 |
| JP | 9-208900 A | 8/1997 |
| JP | 2000-129126 A | 5/2000 |
| JP | 2003-147220 A | 5/2003 |
| JP | 2006-159554 A | 6/2006 |
| JP | 2007-125539 A | 5/2007 |
| JP | 2008-231276 A | 10/2008 |
| JP | 2009-67910 A | 4/2009 |
| JP | 2011-68868 A | 4/2011 |
| JP | 2011-517725 A | 6/2011 |
| JP | 2015-205951 A | 11/2015 |

OTHER PUBLICATIONS

Extended European Search Report dated Nov. 10, 2020, in European Patent Application No. 18757283.9.
International Search Report issued in PCT/JP2018/004323 (PCT/ISA/210), dated Mar. 13, 2018.
Written Opinion of the International Searching Authority issued in PCT/JP2018/004323 (PCT/ISA/237), dated Mar. 13, 2018.

*Primary Examiner* — Wenwen Cai
(74) *Attorney, Agent, or Firm* — Birch, Stewart, Kolasch & Birch, LLP

(57) ABSTRACT

A silicone emulsion composition capable of being formed into a coating film, which contains: (A) 100 parts by mass of an organopolysiloxane containing, per molecule, at least two groups each capable of binding to a silicon atom, wherein the at least two groups are independently selected from a hydroxyl group and an alkoxy group; (B) 0.1 to 50 parts by mass of a surfactant; (C) 0.01 to 10 parts by mass of at least one substance selected from cellulose and a cellulose derivative; (D) 0.5 to 50 parts by mass of colloidal silica; and (E) 50 to 1,000 parts by mass of water.

8 Claims, No Drawings

SILICONE EMULSION COMPOSITION CAPABLE OF BEING FORMED INTO COATING FILM, AND COATING FILM

TECHNICAL FIELD

The present invention relates to a silicone emulsion composition. More particularly, the invention relates to a film-forming silicone emulsion composition containing no organotin compounds or inorganic tin compounds as curing catalysts, and to a cured film obtained from the composition.

BACKGROUND ART

Rubber film-forming silicone emulsion compositions of various formulations have hitherto been known, and are used as, for example, weather stripping materials and coating agents for airbags.

Examples include silicone emulsion compositions made of a hydroxylated diorganopolysiloxane, a colloidal silica and an organotin compound or an organic amine compound (Patent Document 1: JP-A S56-16553), silicone latex compositions made of a siloxane block copolymer consisting of dimethylsiloxane units and monophenylsiloxane units, water, a cationic surfactant, a filler and an aminosilane (Patent Document 2: U.S. Pat. No. 3,817,894), silicone emulsion compositions made of a hydroxyl group-containing organopolysiloxane, a Si—H group-containing organopolysiloxane, colloidal silica, an amide group and carboxyl group-containing silane, an epoxy group-containing silane and a curing catalyst (Patent Document 3: JP-A H08-85760), silicone emulsion compositions made of an alkenyl group-containing organopolysiloxane, an Si—H group-containing organopolysiloxane, colloidal silica, the reaction product of an aminosilane with an acid anhydride, an epoxysilane and an addition reaction catalyst (Patent Document 4: JP-A H09-208826), and silicone emulsion compositions made of a hydrogensiloxane that is end-capped with hydroxyl groups, an emulsifying agent, water and a curing catalyst (Patent Document 5: JP-A H09-208900).

The functional group-containing silanes used in these compositions are amino group-containing silanes, epoxy group-containing silanes, amide group and carboxyl group-containing silanes, or combinations of these. By including these functional group-containing silanes, colloidal silica as a film reinforcement and an organotin compound as a curing catalyst in a silicone latex, it is possible to form a silicone film which has rubber strength and enhances the adherence of various chemicals such as deodorizers and antimicrobial agents to textile substrates.

However, due to concerns with the toxicity of organotin compounds, depending on the intended application, field of use and country, limitations and restrictions on their use are becoming tighter and there exists a desire to substitute dibutyltin compounds with octyltin compounds and, moreover, to substitute octyltin compounds with inorganic tin compounds or other metal compounds.

Curing catalysts other than tin compounds that have been described include bismuth compounds and titanium compounds. Among bismuth compounds, it has been noted that carboxylates of divalent bismuth are effective as curing catalysts for hydrolyzable silicon group-containing polyoxyalkylene polymers (Patent Document 6: JP-A 2000-129126). Among titanium compounds, moisture-curable compositions made up of a hydrolyzable silyl group-containing organic polymer and a titanium tetra(2-ethylhexanoate) have been described (Patent Document 7: JP-A 2003-147220).

However, bismuth compounds have the drawback is that they need to be used together with a Si—H group-containing organopolysiloxane, and a problem with titanium compounds is the slow cure rate.

Film-forming emulsions that contain no curing catalyst include silicone emulsion compositions made of a hydroxyl group-containing organopolysiloxane, a colloidal silica, an amide group and carboxyl group-containing silane, and an epoxy group-containing silane (Patent Document 8: JP-A 2008-231276), and silicone emulsion compositions made of a hydroxyl group-containing organopolysiloxane, colloidal silica and a long-chain alkyl group-containing organoalkoxysilane (Patent Document 9: JP-A 2015-205951). However, problems that have been pointed out with cured films of these compositions are the low film hardness and the low tensile strength.

PRIOR ART DOCUMENTS

Patent Documents

Patent Document 1: JP-A S56-16553
Patent Document 2: U.S. Pat. No. 3,817,894
Patent Document 3: JP-A H08-85760
Patent Document 4: JP-A H09-208826
Patent Document 5: JP-A H09-208900
Patent Document 6: JP-A 2000-129126
Patent Document 7: JP-A 2003-147220
Patent Document 8: JP-A 2008-231276
Patent Document 9: JP-A 2015-205951

SUMMARY OF INVENTION

Technical Problem

In light of the above problems in the prior art, the object of this invention is to provide a film-forming silicone emulsion composition and a film obtained therewith, which composition, even without the use of an organotin compound or an inorganic tin compound, has a good film formability and forms a film that, when cured, has an excellent strength and flexibility and that has a good adherence to various types of substrates, and which emulsion has a good storage stability.

Solution to Problem

The inventors have conducted extensive investigations in order to achieve this object. As a result, they have discovered that a film-forming silicone emulsion composition which includes (A) an organopolysiloxane containing at least two groups selected from silicon-bonded hydroxyl groups and alkoxy groups per molecule, (B) a surfactant, (C) one or more substance selected from cellulose and cellulose derivatives, (D) colloidal silica and (E) water, even without using an organotin compound or an inorganic tin compound, has a good film formability and forms a film that, when cured, has an excellent strength and flexibility and that has a good adherence to various types of substrates. They have also found that the storage stability of the emulsion can be improved. This discovery ultimately led to the present invention.

Accordingly, the invention provides the following film-forming silicone emulsion composition and film.
[1] A film-forming silicon emulsion composition which includes:

(A) 100 parts by weight of an organopolysiloxane having at least two groups selected from silicon-bonded hydroxyl groups and alkoxy groups per molecule, (B) from 0.1 to 50 parts by weight of a surfactant, (C) from 0.01 to 10 parts by weight of one or more substance selected from cellulose and cellulose derivatives, (D) from 0.5 to 50 parts by weight of colloidal silica, and (E) from 50 to 1,000 parts by weight of water.

[2] The film-forming silicone emulsion composition of [1], wherein the cellulose is cellulose nanofibers.

[3] The film-forming silicone emulsion composition of [1] or [2], wherein the cellulose derivative is an alkyl cellulose, a hydroxyalkyl alkyl cellulose, a carboxy alkyl cellulose, a carboxy alkyl cellulose salt, or a mixture thereof.

[4] The film-forming silicone emulsion composition of [3], wherein the alkyl cellulose is methyl cellulose.

[5] The film-forming silicone emulsion composition of [3], wherein the hydroxyalkyl alkyl cellulose is hydroxypropyl methyl cellulose or hydroxyethyl methyl cellulose.

[6] The film-forming silicone emulsion composition of [3], wherein the carboxy alkyl cellulose is carboxy methyl cellulose and the carboxy alkyl cellulose salt is carboxy methyl cellulose sodium.

[7] The film-forming silicone emulsion composition of any of [1] to [6] which contains no organotin compounds or inorganic tin compounds.

[8] A film obtained by curing the film-forming silicone emulsion composition of any of [1] to [7].

Advantageous Effects of Invention

According to this invention, there can be provided a film-forming silicone emulsion composition, and a film obtained therefrom, which composition, even without the use of an organotin compound or an inorganic tin compound, has a good film formability and forms a film that, when cured, has an excellent strength and flexibility and that has a good adherence to various types of substrates, and which emulsion has a good storage stability.

DESCRIPTION OF EMBODIMENTS

The invention is described in detail below.

[Component (A)]

Component (A) is an organopolysiloxane having at least two groups selected from silicon-bonded hydroxyl groups and alkoxy groups per molecule. One type may be used alone or two or more types may be used in combination. Component (A) may be linear or branched, with a branched organopolysiloxane being preferred. Of these, one of average compositional formula (1) below is preferred.

[Chem. 1]

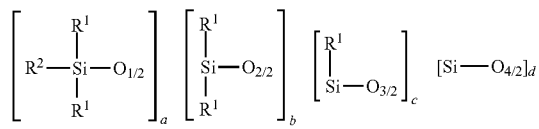

(1)

In the formula, $R^1$ and $R^2$ are each independently a hydrogen atom, a hydroxyl group, or a substituted or unsubstituted monovalent hydrocarbon group or alkoxy group of 1 to 20 carbon atoms, and at least two groups selected from silicon-bonded hydroxyl groups and alkoxy groups are included per molecule. The subscripts a, b, c and d are each numbers which satisfy the conditions $a \geq 2$, $b \geq 5$, $c \geq 0$, $d \geq 0$ and $10 \leq a+b+c+d \leq 15,000$.

$R^1$ and $R^2$ are each independently a hydrogen atom, a hydroxyl group, or a substituted or unsubstituted monovalent hydrocarbon group or alkoxy group of 1 to 20 carbon atoms. Exemplary unsaturated monovalent hydrocarbon groups of 1 to 20 carbon atoms include alkyl groups having from 1 to 20 carbon atoms, cycloalkyl groups having from 3 to 10 carbon atoms, and aralkyl groups having from 7 to 20 carbon atoms. Specific examples include alkyl groups such as methyl, ethyl, propyl, butyl, pentyl, hexyl, heptyl, octyl, nonyl, decyl, dodecyl, tetradecyl, hexadecyl and octadecyl groups; cycloalkyl groups such as cyclopentyl and cyclohexyl groups; alkenyl groups such as vinyl, allyl and hexenyl groups; and aryl groups such as phenyl, tolyl and naphthyl groups. Exemplary substituted monovalent hydrocarbon groups of 1 to 20 carbon atoms include the foregoing monovalent hydrocarbon groups of 1 to 20 carbon atoms in which some portion of the hydrogen atoms is substituted with, for example, halogen atoms, amino groups, acryloxy groups, methacryloxy groups, epoxy groups, mercapto groups, carboxyl groups or hydroxyl groups. Preferred examples include monovalent hydrocarbon groups of 1 to 6 carbon atoms, such as methyl, ethyl, propyl, butyl and phenyl groups. Examples of alkoxy groups of 1 to 20 carbon atoms include methoxy, ethoxy, propoxy, butoxy, hexyloxy, heptyloxy, octyloxy, decyloxy and tetradecyloxy groups.

Organopolysiloxanes in which at least 80% of all $R^1$ groups are methyl groups are more preferred. $R^2$ is preferably a hydrogen atom, a hydroxyl group, or an alkyl or alkoxy group of 1 to 18 carbon atoms; and more preferably a hydrogen atom, a hydroxyl group or an alkyl group of 1 to 6 carbon atoms.

The subscripts a, b, c and d are each numbers which satisfy the conditions $a \geq 2$, $b \geq 5$, $c \geq 0$, $d \geq 0$ and $10 \leq a+b+c+d \leq 15,000$; and more preferably numbers which satisfy the conditions $a \geq 2$, $b \geq 5$, $c+d \geq 1$ and $10 \leq a+b+c+d \leq 15,000$. The subscripts a, b, c and d are preferably numbers such that the organopolysiloxane has a viscosity at 25° C. of at least 10 mPa·s and less than 500,000 mPa·s, more preferably numbers such that the viscosity is at least 50 mPa·s and less than 250,000 mPa·s, and even more preferably numbers such that the viscosity is at least 100 mPa·s and less than 100,000 mPa·s. This viscosity is the absolute viscosity. When measurement as a liquid is possible, the viscosity value obtained for the liquid itself is used; when measurement in this way is impossible, the value obtained by using a rotational viscometer to measure the viscosity at 25° C. of a 15 wt % solution in toluene is used (the same applies below).

Specific examples of the organopolysiloxane serving as component (A) in the invention are given below.

[Chem. 2]

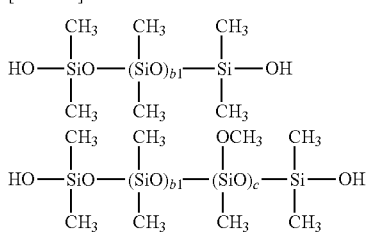

-continued

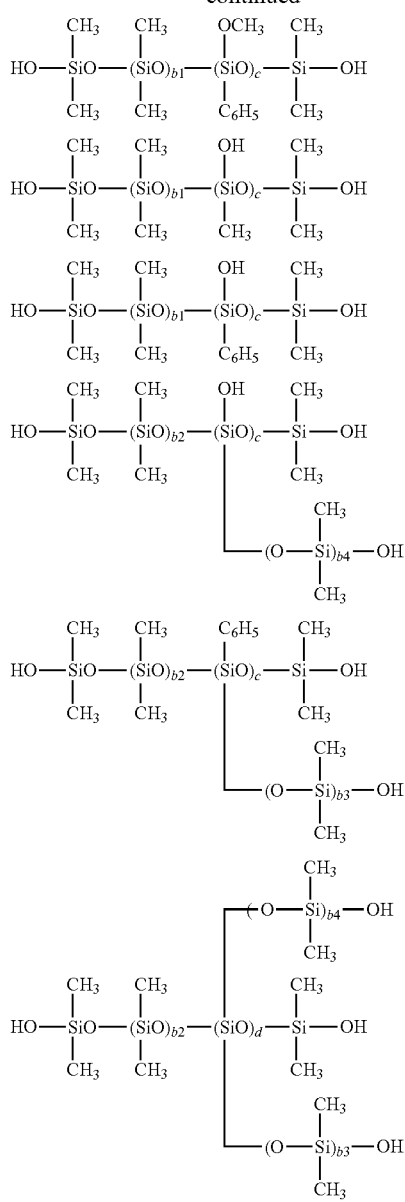

Here, the sum of b1 to b4 is b above, and c and d are the same as above.

[Chem. 3]

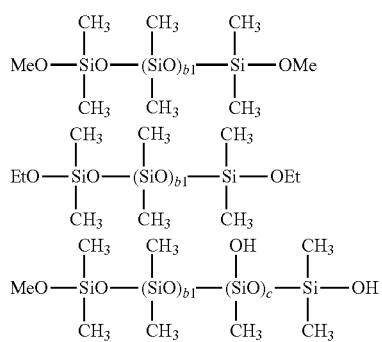

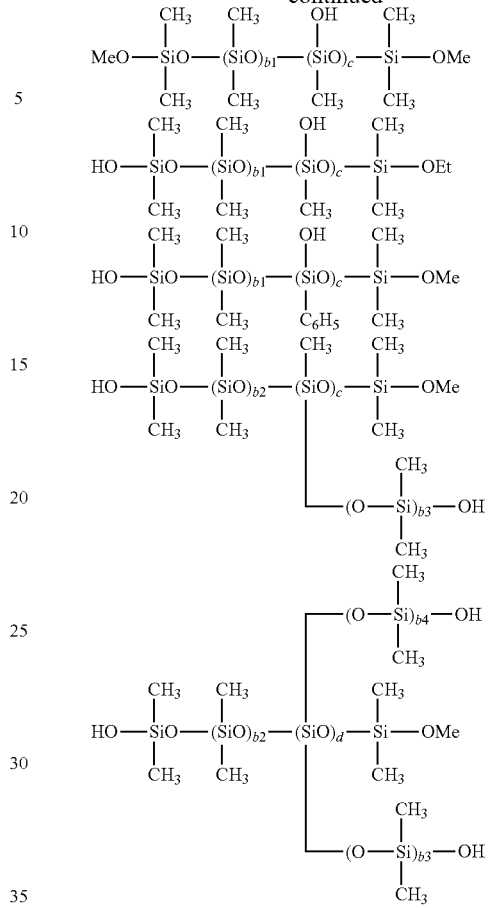

Here, Me stands for a methyl group, Et stands for an ethyl group, the sum of b1 to b4 is b above, and c and d are the same as above.

The organopolysiloxane in component (A) of the invention can be synthesized by a known method. For example, this can be obtained from a cyclic siloxane such as octamethylcyclotetrasiloxane, or by an equilibration reaction between this and an α,ω-dihydroxysiloxane oligomer, an α,ω-dialkoxysiloxane oligomer or an organoalkoxysilane, in the presence of a catalyst such as an alkali metal hydroxide. Alternatively, it can be obtained by a dehydration and dealcoholation/condensation reaction between an α,ω-dihydroxydimethylpolysiloxane and an organoalkoxysilane in the presence of a catalyst such as an alkali metal hydroxide.

The organopolysiloxane of component (A) is preferably used in the form of an oil-in-water emulsion. Methods for rendering it into the form of an emulsion include known mechanical emulsification methods and emulsion polymerization methods.

In known mechanical emulsification methods, an oil-in-water emulsion can be obtained by mixing the organopolysiloxane of component (A) with a surfactant, and emulsifying this mixture with an emulsifier such as a homogenizing mixer, a homogenizer, a colloid mill or an in-line mixer.

In known emulsion polymerization methods, an oil-in-water emulsion can be easily obtained by first emulsifying and dispersing a cyclic siloxane, an α,ω-dihydroxysiloxane oligomer, an α,ω-dialkoxysiloxane oligomer or an organoalkoxysilane in water using an anionic surfactant, a cationic surfactant or a nonionic surfactant, and subsequently, where necessary, adding a catalyst such as an acidic or alkaline substance and carrying out an emulsion polymerization reaction.

[Component (B)]

The surfactant serving as component (B) is exemplified by, without particular limitation, nonionic surfactants, anionic surfactants, cationic surfactants and amphoteric surfactants. These may be of one type used alone or two or more types may be suitably used in combination.

Examples of nonionic surfactants include polyoxyalkylene alkyl ethers, polyoxyalkylene alkyl phenol ethers, polyoxyalkylene alkyl esters, polyoxyalkylene sorbitan alkyl esters, polyethylene glycol, polypropylene glycol and diethylene glycol.

Of these, polyoxyalkylene alkyl ethers of general formula (2) below are preferred.

$$R^3O(EO)_n(PO)_mH \quad (2)$$

In this formula, $R^3$ is a linear or branched alkyl group of 8 to 30 carbon atoms, preferably 8 to 12 carbon atoms; n and m are each from 0 to 50, preferably from 0 to 25, with the sum n+m=5 to 20. EO stands for an oxyethylene group, and PO stands for an oxypropylene group.

Examples of anionic surfactants include alkyl sulfates of general formula (3) below and alkylbenzene sulfonates of general formula (4) below.

$$R^4\text{—}OSO_3M \quad (3)$$

$$R^4\text{—}C_6H_4\text{—}OS_3M \quad (4)$$

In these formulas, $R^4$ is a linear or branched alkyl group of 8 to 30 carbon atoms, preferably 8 to 12 carbon atoms. M is a hydrogen atom or a metallic element; and preferably a hydrogen atom, an alkali metal element or an alkaline earth metal element.

Examples of alkyl sulfates include sodium lauryl sulfate. Examples of alkylbenzene sulfonates include hexylbenzene sulfonate, octylbenzene sulfonate, decylbenzene sulfonate, dodecylbenzene sulfonate, cetylbenzene sulfonate and myristylbenzene sulfonate.

Examples of anionic surfactants include higher fatty acids such as lauric acid, stearic acid, oleic acid and linolenic acid, and salts thereof; polyoxyethylene monoalkyl ether sulfates of general formula (5) below, and polyoxyethylene alkyl phenyl ether sulfates of general formula (6) below.

$$R^5O(EO)_{n'}(PO)_{m'}SO_3M \quad (5)$$

$$R^5\text{—}C_6H_4\text{—}O(EO)_{n'}(PO)_{m'}SO_3M \quad (6)$$

In these formulas, $R^5$ is a linear or branched alkyl group of 8 to 30 carbon atoms; M is a hydrogen atom or a metallic element; n' and m' are each integers from 0 to 30, and preferably from 0 to 20, with the sum n'+m'=5 to 20. EO stands for a polyoxyethylene group, and PO stands for a polyoxypropylene group.

Examples of cationic surfactants include anionic emulsifying agents such as alkylbenzene sulfonates and alkyl phosphates, and cationic emulsifying agents such as quaternary ammonium salts and alkylamines.

Examples of amphoteric surfactants include alkyl betaines and alkyl imidazolines.

The content of component (B) per 100 parts by weight of component (A) is from 0.1 to 50 parts by weight, preferably from 0.5 to 25 parts by weight, and more preferably from 1 to 10 parts by weight. At less than 0.1 part by weight, the amount of component (B) is inadequate and obtaining a film-forming emulsion is difficult. At more than 50 parts by weight, the resulting film-forming silicone emulsion composition has a poor stability over time.

[Component (C)]

The one or more substance selected from cellulose and cellulose derivatives serving as component (C) is a substance that acts as a film reinforcement. Such substances may be used singly or two or more may be suitably used in combination.

The cellulose is exemplified by cellulose nanofibers. The cellulose nanofibers can be used as an aqueous dispersion. The cellulose nanofiber dispersion that is used may be one that is commercially available, and is not limited as to the type thereof. For example, use can be made of one in which the average fiber width has been nanoized to less than 10 nm, a specific example of which is Rheocrysta (from DKS Co., Ltd.).

Examples of cellulose derivatives include alkyl celluloses, hydroxyalkyl alkyl celluloses, carboxy alkyl celluloses, carboxy alkyl cellulose salts, and mixtures of these. The cellulose derivative may be used as an aqueous solution. An example of an alkyl cellulose is methyl cellulose. Hydroxypropyl methyl cellulose and hydroxyethyl methyl cellulose are preferred as hydroxyalkyl alkyl celluloses. Carboxy methyl cellulose is preferred as the carboxy alkyl cellulose. Carboxy methyl cellulose sodium is preferred as the carboxy alkyl cellulose salt. The cellulose derivative used may be one that is commercially available, and is not limited as to the type thereof. Examples include Metolose (Shin-Etsu Chemical Co., Ltd.), Cellogen (DKS Co., Ltd.) and Sunrose (Nippon Paper Industries Co., Ltd.).

The content of component (C) per 100 parts by weight of component (A), expressed in terms of pure cellulose derivative, is from 0.01 to 10 parts by weight, preferably from 0.05 to 5 parts by weight, and more preferably from 0.1 to 2 parts by weight. At less than 0.01 part by weight, the cured film obtained by curing the resulting film-forming silicone emulsion composition is unable to achieve a sufficient film strength. At more than 10 parts by weight, the viscosity of the resulting film-forming silicone emulsion composition is high, resulting in a poor handleability.

[Component (D)]

The colloidal silica serving as component (D) acts as a film reinforcement. In this invention, the colloidal silica may be used as an aqueous dispersion. The aqueous dispersion of colloidal silica that is used may be one that is commercially available, and is not limited as to the type thereof. For example, use can be made of one that has an average particle size of from 5 to 50 nm and is stabilized with, for example, sodium, ammonium or aluminum. Specific examples include Snowtex (Nissan Chemical Corporation), Ludox (W.R. Grace & Co.), Silicadol (Nippon Chemical Industrial Co., Ltd.), Adelite AT (Adeka Corporation), Cataloid S (Catalysts and Chemicals Industries Co., Ltd.) and Cosmo (JGC Catalysts and Chemicals Ltd.).

The content of component (D) per 100 parts by weight of component (A), expressed in terms of pure colloidal silica, is from 0.5 to 50 parts by weight, and preferably from 1 to 30 parts by weight. At a colloidal silica content of less than 0.5 part by weight, there are no film strength and flame retardancy-improving effects; at more than 50 parts by weight, the film becomes hard and brittle, and the elongation and flexibility decrease.

[Component (E)]

Water is included as component (E) in the film-forming silicone emulsion composition of the invention. The water content per 100 parts by weight of component (A) is from 50 to 1,000 parts by weight, and preferably from 50 to 500 parts by weight.

The film-forming silicone emulsion composition of the invention, even without the use of an organotin compound or an inorganic tin compound, has a good film formability and forms a film that, when cured, has an excellent strength and flexibility and has a good adherence to various types of substrates, and moreover is able to enhance the storage stability of the emulsion. Moreover, when necessary, the film-forming silicone emulsion composition of the invention may suitably include other ingredients which are added and included in textile treatments, water-based paints and cosmetic products, such as thickeners, defoamers, pigments, inorganic powders, penetrants, antistatic agents and preservatives.

[Method of Preparation]

The method for preparing the film-forming silicone emulsion composition of the invention may be in accordance with a hitherto known emulsion polymerization method or phase inversion emulsification method. The emulsion apparatus is not particularly limited. For example, a homogenizing mixer, a homogenizer, a colloid mill, a universal mixer/agitator, a Combi Mix or an in-line mixer may be used. After an emulsion composition has been prepared with components (A) and (B), the other ingredients may be included. The solids concentration of the silicone emulsion composition is preferably from 10 to 80 wt %, and more preferably from 20 to 70 wt %.

The film-forming silicone emulsion compositions of the invention may be widely used as, for example, binders for inorganic or organic substances, textile treatments, paints, mold parting agents, back surface treatments in pressure-sensitive adhesive sheets, and cosmetic products.

[Cured Product]

The present invention can provide a film made of the above film-forming silicone emulsion composition in a cured form. The film-forming silicone emulsion composition is used for treating various types of substrate surfaces, such as textiles, paper, metal, wood, rubber, plastic and glass. The substrate treatment method is not particularly limited, and can be carried out by a known method such as brush painting, roll coating, spray painting, knife coating and dip coating. So long as the moisture within the film-forming silicone emulsion is allowed to evaporate, curing may be carried out at room temperature or under warming and is not particularly limited as to the length of time and other conditions.

Examples of uses for the film-forming silicone emulsion compositions of the invention include, but are not limited to, cosmetic products (e.g., film-forming materials), textile treatments (e.g., hand-improving agent for textiles), binders for inorganic or organic substances (e.g., binders for functional inorganic fillers such as photocatalysts), paints, mold release agents, back surface treatments in pressure-sensitive adhesive sheets, surface coatings for various types of substrates, agents for imparting releasability or slip properties to the surface of rubber articles, and water repellents for paper and wood.

EXAMPLES

The invention is illustrated more fully below by way of Examples and Comparative Examples, although the invention is not limited by these Examples. In the following Examples, unless noted otherwise, references to "%" in the composition signify percent by weight, and references to "parts" signify parts by weight.

Preparation Example 1: (A-1)

A two-liter polyethylene beaker was charged with 498 g of octamethylcyclotetrasiloxane, 2 g of phenyltriethoxysilane, 50 g of a 10% aqueous solution of sodium lauryl sulfate and 50 g of a 10% aqueous solution of dodecylbenzene sulfonate, and the flask contents were uniformly emulsified with a homogenizing mixer and subsequently diluted by the gradual addition of 400 g of water, thereby giving a uniform white emulsion. This emulsion was transferred to a two-liter glass flask equipped with a stirrer, a thermometer and a reflux condenser, and the polymerization reaction was carried out at 50° C. for 24 hours, following which the system was aged at 10° C. for 24 hours and then neutralized with 12 g of a 10% aqueous solution of sodium carbonate. This emulsion, after 3 hours of drying at 105° C., had a nonvolatiles content of 45.4%. The organopolysiloxane in the emulsion was subjected to instrumental analysis such as NMR, GPC and IR, whereupon it was found to be a product (A-1) in the form of a soft gel having the average compositional formula

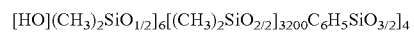

$[HO](CH_3)_2SiO_{1/2}]_6[(CH_3)_2SiO_{2/2}]_{3200}C_6H_5SiO_{3/2}]_4$ wherein the ends are capped with hydroxyl groups and having, as a 15 wt % solution in toluene, a viscosity at 25° C. of 1,200 mPa·s. An emulsion containing the organopolysiloxane of component (A-1) was thus obtained.

Preparation Example 2: (A-2)

A two-liter polyethylene beaker was charged with 500 g of octamethylcyclotetrasiloxane, 50 g of a 10% aqueous solution of sodium lauryl sulfate and 50 g of a 10% aqueous solution of dodecylbenzene sulfonate, and the flask contents were uniformly emulsified with a homogenizing mixer and subsequently diluted by the gradual addition of 400 g of water, thereby giving a uniform white emulsion. This emulsion was transferred to a two-liter glass flask equipped with a stirrer, a thermometer and a reflux condenser, and the polymerization reaction was carried out at 50° C. for 24 hours, following which the system was aged at 10° C. for 24 hours and then neutralized with 12 g of a 10% aqueous solution of sodium carbonate. This emulsion, after 3 hours of drying at 105° C., had a nonvolatiles content of 45.5%. The organopolysiloxane in the emulsion was subjected to instrumental analysis such as NMR, GPC and IR, whereupon it was found to be in the form of crude rubber having the average compositional formula

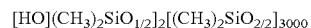

$[HO](CH_3)_2SiO_{1/2}]_2[(CH_3)_2SiO_{2/2}]_{3000}$ and having, as a 15 wt % solution in toluene, a viscosity at 25° C. of 105 mPa·s. An emulsion containing the organopolysiloxane of component (A-2) was thus obtained.

The following were used as component (C).
(C-1) Cellulose nanofibers:
  Rheocrysta I-2SP (DKS Co., Ltd.)
(C-2) Hydroxypropyl methyl cellulose:
  Metolose 60SH-10000 (Shin-Etsu Chemical Co., Ltd.)
(C-3) Carboxy methyl cellulose sodium:
  Cellogen FS (from DKS Co., Ltd.)
(C-4, for comparison) Polyvinyl alcohol:
  Gohsenol EG-40C (from Nippon Synthetic Chemical Industry Co., Ltd.)

Colloidal silica (COSMO S40, from JGC Catalysts and Chemicals Ltd.; active ingredient, 40%) was used as component (D).

Examples 1 to 4, Comparative Examples 1 to 3

Silicone emulsion compositions (nonvolatiles content, 40%) formulated as shown in Table 1 were obtained. Here, the amounts in the table indicate the amounts of the respective ingredients, with the amount of component (B) being the amount included in the emulsions obtained in the foregoing Preparation Examples, and the amount of component (E) including the amounts included in the emulsions obtained in the Preparation Examples and in component (D), etc., as well as any newly added amount aside from these. The following evaluations were carried out on the resulting silicone emulsion compositions. The results are presented in the table. Twenty grams of the resulting silicone emulsion composition was weighed out onto a 15 cm×10 cm polypropylene tray and dried at 25° C. for 48 hours, thereby evaporating off the moisture, whereupon rubbery films were formed in each of Examples 1 to 4 and Comparative Examples 1 to 3.

1. Evaluation of Film Formability

Twenty grams of the respective silicone emulsion compositions were cast into a polypropylene resin disposable tray (150 mm×105 mm×10 mm), left to stand 48 hours in a 25° C., 60% relative humidity atmosphere, and subsequently heated at 105° C. for 1 hour, thereby producing a cured film having a thickness of about 1 mm. The hardness, tensile strength and elongation were measured in accordance with JIS K6249. The evaluation results are presented in Table 1.

2. Storage Stability of Emulsion

One hundred grams of the respective silicone emulsion compositions were placed in glass bottles, which were held at rest and stored for 30 days in a 40° C. thermostatic chamber, following which the appearance and the nonvolatile content in the top and bottom layers were visually examined and the storage stability was evaluated based on the following criteria.

<Evaluation Criteria>

A: No concentration separation between top and bottom layers is observable whatsoever.

B: Slight concentration separation between top and bottom layers is observable.

C: The composition has completely separated into two layers.

3. Film Formability

The condition of the film produced as described above was evaluated in terms of film formability based on the following criteria.

A: A uniform film has formed and is of a strength enabling it to be easily peeled from the disposable tray.

B: A uniform film has formed, but cannot be peeled from the disposable tray.

C: A uniform film has not formed.

TABLE 1

| Composition | | Example | | | | Comparative Example | | |
|---|---|---|---|---|---|---|---|---|
| (pbw) | | 1 | 2 | 3 | 4 | 1 | 2 | 3 |
| Component (A) | (A-1) | 29.5 (100) | 29.5 (100) | 29.5 (100) | | 29.5 (100) | 29.5 (100) | |
| | (A-2) | | | | 29.5 (100) | | | 29.5 (100) |
| Component (B) | | 0.59 (2) | 0.59 (2) | 0.59 (2) | 0.59 (2) | 0.59 (2) | 0.59 (2) | 0.59 (2) |
| Component (C) | (C-1) | 0.3 (1) | | | 0.3 (1) | | | |
| | (C-2) | | 0.3 (1) | | | | | |
| | (C-3) | | | 0.3 (1) | | | | |
| | (C-4), for comparison | | | | | | 0.3 (1) | 0.3 (1) |
| Component (D) | | 10 (34) | 10 (34) | 10 (34) | 10 (34) | 10 (34) | 10 (34) | 10 (34) |
| Component (E) | | 58.6 (199) | 58.6 (199) | 58.6 (199) | 58.6 (199) | 58.6 (199) | 58.6 (199) | 58.6 (199) |
| Film properties | Hardness, type A | 62 | 61 | 55 | 60 | 45 | 35 | 40 |
| | Tensile strength (MPa) | 1.5 | 1.7 | 1.6 | 1.5 | 0.8 | 0.5 | 0.6 |
| | Elongation (%) | 90 | 110 | 110 | 70 | 50 | 40 | 45 |
| Storage stability of emulsion | | A | A | A | A | C | C | C |
| Film formability | | A | A | A | A | B | C | C |

Values in parentheses ( ) indicate amount when component (A) is set to 100 parts by weight.

The invention claimed is:

1. A film-forming silicon emulsion composition comprising:
   (A) 100 parts by weight of an organopolysiloxane having at least two groups selected from silicon-bonded hydroxyl groups and alkoxy groups per molecule,
   (B) from 0.1 to 50 parts by weight of a surfactant,
   (C) from 0.01 to 10 parts by weight of cellulose nanofibers,
   (D) from 0.5 to 50 parts by weight of colloidal silica, and
   (E) from 50 to 1,000 parts by weight of water.

2. The film-forming silicone emulsion composition of claim 1, which contains no organotin compounds or inorganic tin compounds.

3. The film-forming silicone emulsion composition of claim 1, wherein the cellulose nanofibers have an average fiber width of less than 10 nm.

4. The film-forming silicone emulsion composition of claim 1, wherein the film-forming silicone emulsion composition comprises 0.01 to 10 parts by weight of the cellulose nanofibers as the component (C).

5. The film-forming silicone emulsion composition of claim 1, wherein the film-forming silicone emulsion composition is suitable to form a film by evaporating moisture contained in the film-forming silicone emulsion composition.

6. A film obtained by curing the film-forming silicone emulsion composition of claim 1.

7. The film according to claim 6, wherein the film-forming silicone emulsion composition is cured by evaporating moisture contained in the film-forming silicone emulsion composition.

8. A method to form a film comprising:
applying the film-forming silicone emulsion composition of claim 1 to a substrate; and
evaporating moisture contained in the film-forming silicone emulsion composition so that a film is formed on the substrate.

* * * * *